US012566930B2

(12) United States Patent
Gambhir et al.

(10) Patent No.: US 12,566,930 B2
(45) Date of Patent: Mar. 3, 2026

(54) CONDITIONING OF PRODUCTIVITY APPLICATION FILE CONTENT FOR INGESTION BY AN ARTIFICIAL INTELLIGENCE MODEL

(71) Applicant: Microsoft Technology Licensing, LLC, Redmond, WA (US)

(72) Inventors: Prerana Dharmesh Gambhir, San Jose, CA (US); Chandrasekar Balachandran, Mountain View, CA (US); David Prejban, Mountain View, CA (US); Aynoor Saleem, San Jose, CA (US); Erali Jatin Shah, Sunnyvale, CA (US); Feng Li, Sunnyvale, CA (US); Ziyu Yi, Sunnyvale, CA (US); Cheng Xiang, Richmond (CA); Apoorva Ajit Dhakras, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 18/310,577

(22) Filed: May 2, 2023

(65) Prior Publication Data

US 2024/0370670 A1 Nov. 7, 2024

(51) Int. Cl.
*G06F 40/58* (2020.01)
*G06F 40/103* (2020.01)
(Continued)

(52) U.S. Cl.
CPC ............ *G06F 40/58* (2020.01); *G06F 40/103* (2020.01); *G06F 40/263* (2020.01); *G06F 40/284* (2020.01); *G06F 40/295* (2020.01)

(58) Field of Classification Search
CPC ...... G06F 40/58; G06F 40/103; G06F 40/263; G06F 40/284; G06F 40/295; G06F 40/166; G06F 40/279; G06F 40/56; G06N 20/00
See application file for complete search history.

(56) References Cited

U.S. PATENT DOCUMENTS 11,556,510 B1 * 1/2023 Hanson ................. G06F 16/215
12,118,474 B2 * 10/2024 Polleri ................... H04L 9/088
(Continued)

OTHER PUBLICATIONS

Aspose Cloud: "Cloud based Document manipulation SDKs with JSON response", Retrieve from: https://web.archive.org/web/20230205194655/https://products.aspose.cloud/total/, Feb. 5, 2023, 6 Pages.
(Continued)

*Primary Examiner* — Bhavesh M Mehta
*Assistant Examiner* — Jangwoen Lee
(74) *Attorney, Agent, or Firm* — NovoTechIP International PLLC

(57) ABSTRACT

A data processing system for conditioning productivity application file content for ingestion by an artificial intelligence (AI) language model includes a server system hosting a conversion service, the server system comprising processing and memory resources; an Application Programming Interface (API) for the conversion service to receive productivity application files at any scale; and a format converter of the conversion service, the format converter converting a productivity application file to a format compatible with the AI language model to enable the AI language model to operate on the file content based on a user instruction submitted with the file content as output by the format converter.

18 Claims, 11 Drawing Sheets

(51) Int. Cl.
  G06F 40/263          (2020.01)
  G06F 40/284          (2020.01)
  G06F 40/295          (2020.01)

(56)                    References Cited

U.S. PATENT DOCUMENTS

| 2006/0271849 | A1* | 11/2006 | Thormaehlen | ............ | G06F 8/10 |
| | | | | | 717/136 |
| 2021/0358489 | A1* | 11/2021 | Hussain | ................ | G10L 15/083 |
| 2022/0237409 | A1* | 7/2022 | Zhang | ................... | G06F 40/295 |
| 2023/0274096 | A1* | 8/2023 | Bohra | ................ | G06F 16/3329 |
| | | | | | 704/2 |

OTHER PUBLICATIONS

Grammer Paul: HPaulgrammer/ppt-to-Json, Retrieved from the Internet: URL: https://github.com/paulgrammer/ppttojson/commit/ 23767e7e2cb5claf5a9022cf0fb8998077a508da#diff-b33563055168 2c19a781afebcf4d07bf978fb1f8ac04c6bf87428ed5106870f5, Nov. 11, 2021, 3 Pages.
International Search Report and Written Opinion received for PCT Application No. PCT/US2024/026124, Aug. 27, 2024, 12 pages.
Wang Dustin: "Using ChatGPT to extract the summary from a presentation about ChatGPT—an experiment", Retrieved from the Internet: URL: https://www.linkedin.com/pulse/using-chatgpt-extract-summary-from-presentation-experiment-wang/?trackingId= WWwVoktkQrSOIDcJg7UrNw%3D%3D, Feb. 23, 2023, pp. 1-5.
International Preliminary Report on Patentability received for PCT Application No. PCT/US2024/026124, mailed on Nov. 13, 2025, 07 pages.

* cited by examiner

450

Receive file in productivity application format
402

Detect Language/Translate
404

Convert original format to AI compatible format
406

Postprocessing
408

Return AI compatible formatted file to requestor
410

CONDITIONING OF PRODUCTIVITY APPLICATION FILE CONTENT FOR INGESTION BY AN ARTIFICIAL INTELLIGENCE MODEL

BACKGROUND

Large Language Models (LLMs) are powerful Artificial Intelligence (AI) language models that have gained popularity in recent years. Generative Pre-trained Transformers (GPTs) are a type of LLM. These models are designed to generate human-like text by predicting the next word or sequence of words given a specific input. GPT uses a type of neural network architecture called a transformer, which allows it to process large amounts of text data and learn the patterns and relationships between words and phrases in the language. GPT models are trained on massive amounts of text data and can generate high-quality text that is virtually indistinguishable from text written by a human.

LLMs, including GPTs, have been used in a variety of applications, including natural language generation, text classification, and language translation. They have also been used in the development of chatbots and virtual assistants that can respond to user queries in a natural and conversational manner. Overall, LLMs, specifically GPTs, represent significant advances in the field of natural language processing and have the potential to transform the way we interact with language in the digital age.

However, these AI language models may have limitations, including in the area of accepting input structured to most effectively produce useful results. For example, as indicated, these models typically work on natural language inputs. A user can write a question or command in a natural language format that is easily ingested by these AI language models and likely to return a useful result. However, outside this basic context, other forms of input to an AI language model can be much less likely to produce any useful output. Consequently, techniques are needed that increase a user's ability to input to these AI language models.

SUMMARY

In one general aspect, the instant disclosure presents a data processing system for conditioning productivity application file content for ingestion by an artificial intelligence (AI) language model that includes a server system hosting a conversion service, the server system comprising processing and memory resources; an Application Programming Interface (API) for the conversion service to receive productivity application files at any scale; and a format converter of the conversion service, the format converter converting a productivity application file to a format compatible with the AI language model to enable the AI language model to operate on the file content based on a user instruction submitted with the file content as output by the format converter.

In another general aspect, the instant disclosure presents a method for conditioning productivity application file content for ingestion by an artificial intelligence (AI) language model, the method comprising: receiving productivity application files with a server system hosting a conversion service via an Application Programming Interface (API) for the conversion service; converting the content of the productivity application files to a format compatible with the AI language model to enable the AI language model to operate on the file content based on a user instruction submitted with the file content; and returning files to a requestor with the content in the format compatible with the AI language model to enable use of the AI language model on the content independent of an original productivity application file format.

In another general aspect, the instant disclosure presents a non-transitory computer-readable medium comprising a conversion service for conditioning productivity application file content for ingestion by an artificial intelligence (AI) language model, the medium comprising instructions that, when executed by a host device for the conversion service, cause the host device to: receive productivity application files with a server system hosting a conversion service via an Application Programming Interface (API) for the conversion service; convert the content of the productivity application files to a format compatible with the AI language model to enable the AI language model to operate on the file content based on a user instruction submitted with the file content; and return files to a requestor with the content in the format compatible with the AI language model to enable use of the AI language model on the content independent of an original productivity application file format.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
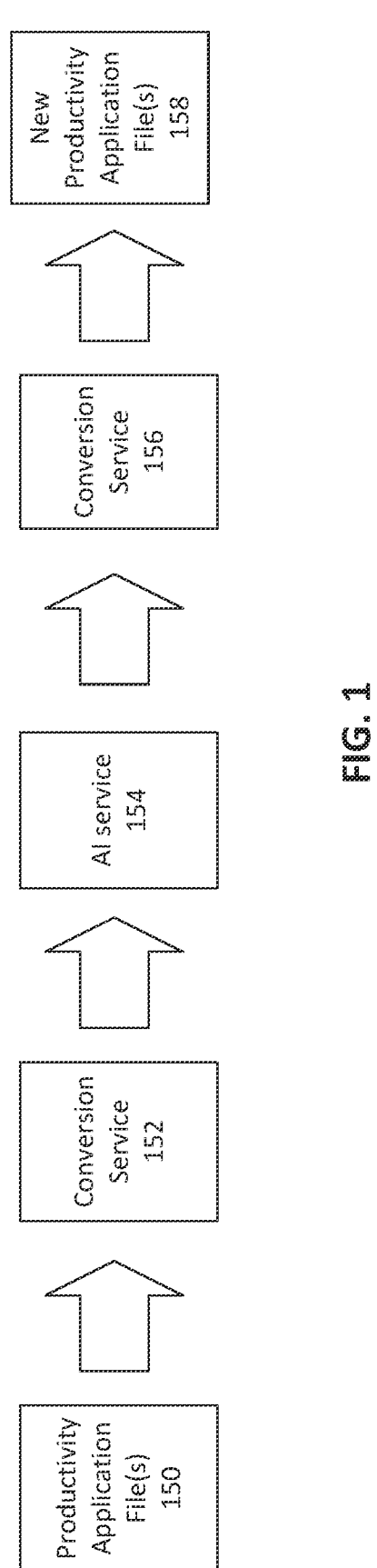
FIG. 1 depicts an example flow in which aspects of this disclosure may be implemented.

As noted above, AI language models, such as LLMs and GPTs, have become very useful to generate text, of a quality on par with human written text. These models respond to natural language prompts and can be used in a wide variety of applications. However, these models may have limitations, including in the area of accepting input that is structured to most effectively produce useful results. For example, a user may have a file, such as a document, spreadsheet or similar, on which the user would like to have the AI model perform some specified task. However, AI language models generally cannot accept such files as input and produce a useful response. This is largely due to the formatting of such files.

As used herein and in the appended claims, the term "productivity application" refers to an application with which a user organizes data and generates a resulting file. Examples of productivity applications include word processors that produce documents, spreadsheet applications that produce spreadsheets, presentation applications that produce slide shows or other presentation formats, graphic design applications that produce graphic documents and similar applications. One prominent example of a suite of productivity applications is the Microsoft Office® suite of applications including Excel®, Word™ and PowerPoint®.

Different productivity applications will each incorporate a specific format in which the content in files produced by that application is created and stored. When the application opens a file that was created with that application, the application will naturally be able to interpret the format of the file so as to accurately utilize and render the data or content in the form that the author or editor has arranged. When a user wants to open a file from a first productivity application with a second, different productivity application, the second application may be unable to understand the format in which the data of the file is stored and, therefore, be unable to accurately render or utilize the file. Often, in such a circumstance, the user may use some tool to convert the file from the format of the original productivity application to that of the second or target productivity application.

Similar issues will arise if a user wants to utilize a file from a productivity application as an input to an AI language model. For example, the user may want to input a file from a particular productivity application to an AI language model with a prompt that the AI language model is to summarize the content of the file. However, because of the file formatting, security and compliance measures, the user is not able to simply input the actual file successfully to the AI language model. If the user tries this, the AI language model will likely be confused by the formatting of the data in the file and unable to return any useful result.

In a simple case, the user may be able to copy a text portion of a document and paste that text into the input for the AI language model along with the instruction to produce a summary of the following text. However, this may exclude non-text content of the file from analysis and be timeconsuming for the user. If the user wants to have the AI language model perform operations on a large corpus of document files or wants to have the AI language model perform operations on a file for which it is not easy to extract pure text for the input, or such text is only a fraction of the file content, or the file only contains an image or images, this simple workaround described here will be ineffective.

There are a number of data formats which current AI language models can find compatible and readily utilize. These include, but are not limited to, text, of course, but also comma separate values (CSV), JavaScript Object Notation (JSON) and Portable Network Graphics (PNG). These formats allow graphics and photographs to be intelligible to current AI language models in addition to natural language text. As used herein and in the appended claims, the term "format compatible with an AI language model" will refer to a file format that is readily ingestible to an AI language model. What format or formats are readily ingestible to a particular AI language model will vary depending on the configuration of that specific AI language model. However, in general, formats that are used by applications from multiple developers, such as those examples listed above, e.g., CSV, JSON, text or rich text, PNG, etc., will be compatible with different AI language models, while formats, such as proprietary formats, that are used only by the application or applications of a specific developer will not likely be readily ingestible by AI language models, unless the AI model has been specifically constructed to ingest that specific file format or formats. Consequently, the present disclosure will introduce more effective systems and methods for converting productivity application files into a format that can be ingested and utilized by current AI language models with additional features to promote the security and scalability of using AI language models to process the information in file repositories.

FIG. 1 depicts an example flow in which aspects of this disclosure may be implemented. As shown in FIG. 1, the flow begins with a number of files 150 from a productivity application. The user desires to have an AI language model operate on these files. For example, the user may want the AI language model to summarize or rewrite the content of the files. As will be explained in detail below, the user is able to submit the file or files to a conversion service 152. The conversion services 152 will operate on the format of the productivity application files to convert the format or condition the content of the files to a format that is compatible with AI language models.

The resulting conditioned content can then be submitted to an AI service 154, e.g., an AI language model as described herein. The content can be accompanied by an instruction or prompt to the AI language model as to what is to be done with the file content, e.g., summarize, rewrite, reorganize, etc. Having the content in a compatible format, the AI service 154 will be able to successfully execute the instructions and produce a useful result.

The flow may include additional conversion service 156 to convert the output from the AI service 154 back into the original productivity application file format. The user can then receive new productivity application files 158 and will be able to open them with the original productivity application. The user will then have access to the content as it has been changed or augmented by the AI service 154 in the manner requested.

For example, a large number of textual documents, with or without accompanying graphics, could be submitted to the conversion service 152 and then, with the content reformatted, submitted to the AI service 154 with an instruction to summarize the documents. The AI service 154 may then output a document that summarizes all the input documents. That summary document can then be converted into the format used by the original productivity application through the conversion service 156 and then returned to the requesting user.

Figure 2A:
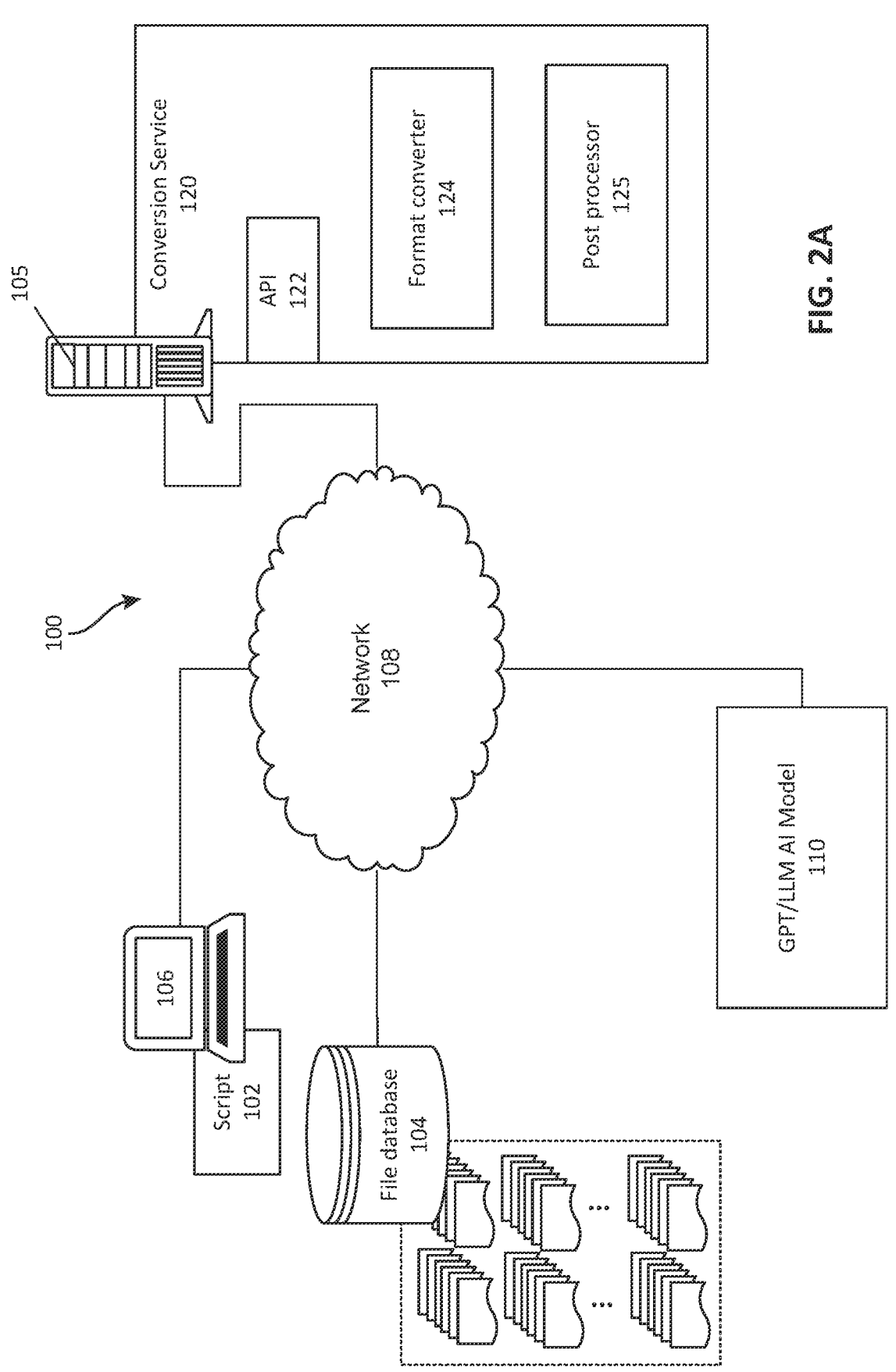
FIG. 2A depicts an example system for preparing files to be used as input to an AI language model according to principles described herein.

FIG. 2A depicts an example system for preparing files to be used as input to an AI language model according to principles described herein. As shown in FIG. 2A, a user, for example an enterprise, may have database 104 of files created with various productivity applications. This database 104 may include thousands, hundreds of thousands or even more files. The user may want to use an AI model 110 such as a GPT or LLM model to operate on the content of these files. As noted, this may be to summarize, reorganize, rewrite or perform some other operation on the content of these files. This may include renaming or improving the searchability and indexing of the files. The potentially large size of the database 104 may have previously presented a practically insurmountable barrier to using an AI model to process the content of these productivity application files for the reasons described above.

In the system 100 of FIG. 2A, however, the user is able to process some or all of the file database 104 using an AI language model 110 by conditioning or reformatting the content of the files. Specifically, using a computer 106 networked or otherwise in communication with the database 104, the user can write a script 102 that will submit files or batches of files from the database 104 to a conversion service 120 to be described below. As shown in FIG. 2A, the computer 106, database 104 and conversion service 120 are connected through a network 108, for example, the Internet.

The conversion service 120 is hosted on a server or group of servers 105. The conversion service 120 has an Application Programming Interface (API) 122 that can be used by the script 102 to receive files to the conversion service. This API can be a Representational State Transfer (REST) API. REST is a widely used architectural style for building web services that are lightweight, scalable, and easy to maintain. REST APIs use Hypertext Transfer Protocol (HTTP) as the underlying communication protocol and are characterized by their use of stateless requests and responses.

The API 122 can also use gRPC, which is an open-source framework for building high-performance, language-agnostic, and platform-independent RPC (Remote Procedure Call) services. Unlike REST, gRPC uses a binary protocol over HTTP/2 as its underlying transport protocol and supports bidirectional streaming and flow control. By combining REST and gRPC, developers can take advantage of the benefits of both protocols in their distributed systems. REST can be used for building simple and lightweight APIs that are easy to consume by web and mobile clients, while gRPC can be used for building high-performance, low-latency services that require efficient serialization and deserialization of data. In a REST HTTP/gRPC solution, REST APIs can be used as a front-end to gRPC services, providing a simple and user-friendly interface for clients to interact with the conversion service 120.

The ability to use a script 102 with an API 122 for the conversion service 120 allows the service to be entirely scalable. Regardless of the size of the database 104, the script 102 can batch files, adjusting the size of the batches or the number of batches, for submission to the conversion service 120 through the API 122 to achieve conversion of all the files 104 into AI model compatible formatting.

The conversion service 120 includes a format converter 124, to be described in more detail below, that will convert a productivity application file from its native format into a format that is compatible or more compatible with an AI language model 110. The conversion service 120 may also include a post processor 125 to additionally condition the output by, for example, removing sensitive data, i.e., Personal Identifiable Information (PII), from the file content in preparation for submission to an open AI language model 110. Consequently, after the converted files are returned to the user's system 106, the user can submit the conditioned data via the network 108 to an AI model 110, such as a GPT or LLM model, for processing.

Figure 2B:
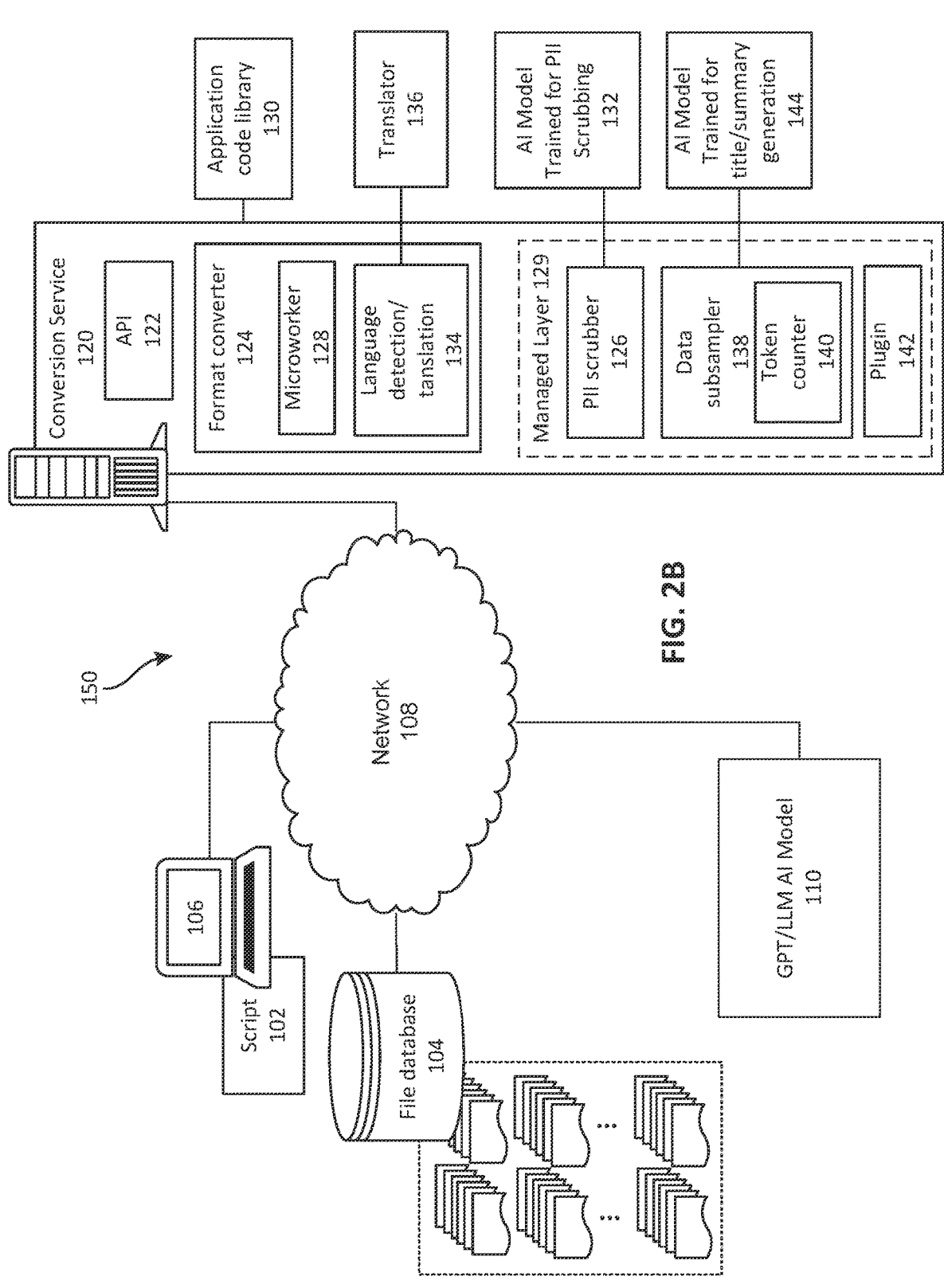
FIGS. 2B and 2C depict other examples of a system for preparing files to be used as input to an AI language model according to principles described herein.

FIG. 2B depicts additional detail of an example system for preparing files to be used as input to an AI language model according to principles described herein. In addition to what was explained in FIG. 2A, FIG. 2B illustrates that the format converter 124 includes a microworker 128. In the context of microservices, a microworker is a small, lightweight piece of code that performs some specific task or function within a larger application or system. Consequently, when working with a service such as the present conversion microservice, a microworker can help speed up development and make it easier to maintain and update the system over time. By isolating specific functionality into individual microworkers, it is possible to more easily refactor, test, and deploy new features or updates, without affecting the rest of the system. More specifically, the microworker 128 is to perform the format conversion of the files 104. In this application, the worker or microworker is simply a program or script that performs the conversion of the file from its native format to a target format. This conversion involves taking the content of the file in its current organization or format and reorganizing that content according to a different organization or format. The microworker 128 may have access to an application code library 130 for the productivity application that produced a given file. Using this application code library, the microworker 128 is better enabled to parse the formatting of the file content and convert the formatting of the content to a format that is compatible with an AI language model 110. For example, in the context of the Microsoft Office® suite, a native Win32 microworker is used to perform the actual file parsing and conversion to the desired format.

Current AI models 110 are largely trained and operate best on content in the English language. Consequently, the file converter 124 may also include a module 134 to detect the language of the files 104 being processed. If the files 104 are not written in English, the language detection/translation module 134 will translate the content into English. This may be done by calling a translator or translation service 136 to translate content from another natural language to English. Again, when the converted files are returned to the user system 106, the user can submit the converted files, as translated into English, to an open AI model 110 an expect a better response from the AI model 110 than might be achieved if the content were in a different, original human language.

As will be described below, the native micro worker interacts with a managed layer that performs additional parsing and post processing such as PII scrubbing, data subsampling, language type detection/conversion, token counting and a plugin for adding additional features dedicated to helping AI/ML pipelines process office files. Specifically, the microworker 128 works with a managed layer 129. The managed layer 129 can include any of the following additional functionalities.

As noted above, the conversion service may further process the content of the files 104 to remove or scrub any PII. Accordingly, the managed layer 129 includes a PII scrubber 126. This scrubber 126 will parse the content of any file 104 being converted and remove any PII. This may be done by calling an AI model 132 that is trained to identify and remove PII from the file content. This AI model 132 may also be trained for a specific industry or application.

For example, the files 104 could be medical records which have legal privacy protections that must be observed. For example, the Health Insurance Portability and Accountability Act of 1996 (HIPAA) is a federal law in the United States that required the creation of national standards to protect sensitive patient health information from being disclosed without the patient's consent or knowledge. In this example, the AI model 132 can be trained on a training set of medical records to identify the PII in the medical records and delete that PII from the output content.

Figure 2C:
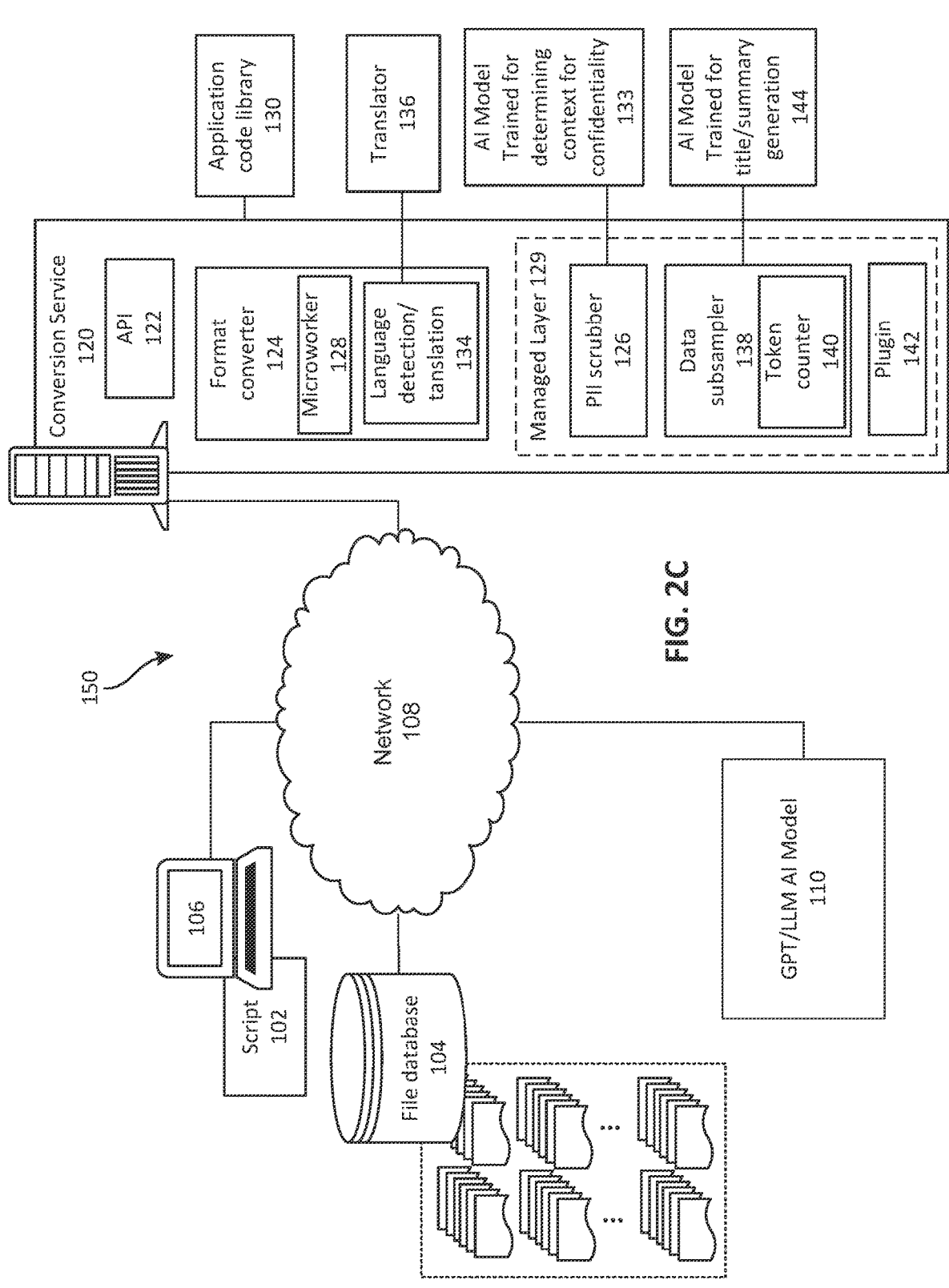

Similarly, the AI model 132 can be trained generally or on specific types of files to recognize and remove PII. In this way, when the converted files are returned to the user's system 106, the user can submit the converted files to an open AI model 110 without concern over disclosing confidential information or PII. In some examples, the conversion service will have access to a number of AI models or similar tools each trained for handling confidentiality or security in different contexts. Consequently, the conversion service will look for user instructions and/or context signals, such as the source of the productivity application files, and utilize the corresponding AI tool for the scrubbing or other security functions applied to the incoming files without requiring input from the user. For example, if the productivity application files are being submitted by a healthcare entity, the conversion service will utilize an AI model as described above that is trained to appropriately protect confidentiality in medical records. In another example, if the productivity application files are being submitted by a tax authority, the conversion service will utilize an AI model trained to protect and process the PII and financial data in tax records. Any number of different contexts, industries or sectors can be adaptively handled by the conversion service where the conversion service determines the source or context of the submitted productivity files and calls an appropriate corresponding AI tool to scrub or otherwise protect or comply with legal requirements regarding the confidential information in that type of productivity files. FIG. 2C illustrates a system similar to that of FIG. 2B, but includes an AI model 133 that can be utilized by the conversion service 120 to determine the context, e.g., the industry, to which submitted productivity files belong. This AI model 133 is trained on productivity files from different contexts to use the terminology, layout and other features common to the files from a particular context to identify the context. Using the examples above, the AI model 133 may recognize from the terminology, layout or other common features that the productivity files are health care files or tax/financial documents. With this determination, the conversion service 120 can then apply the corresponding processing specific to protecting confidentiality or complying with legal requirements for that type of productivity file, as described above. This provides the advantage that bulk conversion of productivity files can be performed adaptively depending on the context.

Returning to FIG. 2B, the managed layer 129 may also include a data subsampler 138. Among its functions, the data subsampler 138 may generate a new title and/or summary for a file 104 that is being processed by the conversion service to assist the user in identifying and organizing the converted files being returned by the conversion service 120.

For example, the data subsampler 138 may call an AI model 144 that is trained to generate a title and/or a summary for input content. This AI model 144 could be the same open AI model 110 or a separate AI model. Alternatively, this AI model 144 is not restricted to being a pre-trained model and can be generalized to do tone detection, corrections and any other general language operations.

For example, with a presentation file comprising a number of slides, titles and main points can be extracted from each slide to derive appropriate file names for large data sets. Custom summaries of a full slide show can be streamlined to a 2-3 line summary as indicated per a user's profile and background where the summary and tone are tailored to the user or audience members based on their subscription profiles. The data subsampler 138 can also perform spell-checking/formatting directly on converted data, such as JSON data. This can be helpful if and when the revised content is converted back to its original format for the corresponding productivity application, e.g., PowerPoint®.

Lastly, the data subsampler 138 of the managed layer 129 may include a token counter 140. The managed layer 129 may also include a plugin 142 for adding additional features dedicated to helping an AI/ML pipeline, including the AI model 110, process productivity application files. For example, the tool, i.e., conversion service, can also help with accessibility where a summary can be read out loud to the user with the correct tone.

Figure 3A:
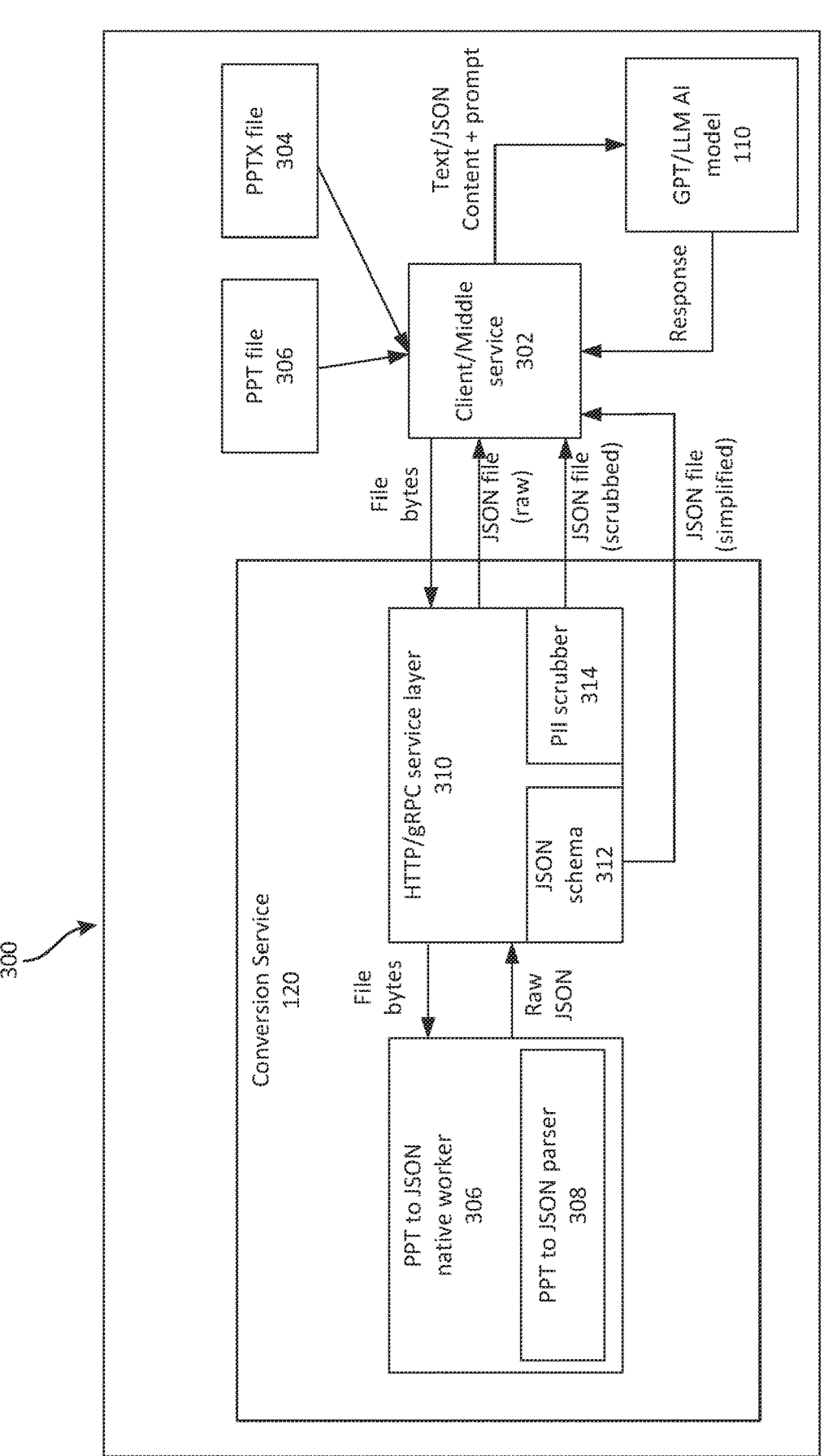
FIG. 3A depicts a specific illustrative use case of preparing a PowerPoint® (PPT) file to be used as input to an AI language model according to principles described herein.

FIG. 3A depicts a specific illustrative use case 300 of preparing a PowerPoint® (PPT) file to be used as input to an AI language model according to principles described herein. As shown in FIG. 3A, a PPT file 305 or PPTx file 304 is to be prepared for processing by an AI model 110. This file is owned by or input to a client or middle service 302. The file bytes of the file 304/305 are submitted by the client 302 to the conversion service 120 as described above, for example, via an HTTP/gRPC service layer 310. The file bytes are passed to a native worker 306 configured to convert PPT file data to JSON format. This worker 306 includes a PPT to JSON parser 308.

Raw JSON data is returned to the service layer 310. Using a JSON schema, the service layer 310 can return a JSON file in simplified form to the client 302. The service layer 310 can also include a PII scrubber 314. As described above, the PII scrubber 314 produces a scrubbed JSON file that is returned to the client 302. The service layer 310 may also return a raw JSON file to the client.

Upon receipt of the converted file, the client can submit the converted file to an AI language model 110. This submission may include both the content of the file and a text prompt stating what the AI language model 110 is to do with or to the file content. Thus both text and JSON data may be part of the input to the AI language model 110. The AI language model 110 will then return a response to the client 302. Because of the conversion of the file to an AI compatible format, this response should be more useful than would have been the case otherwise.

Figure 3B:
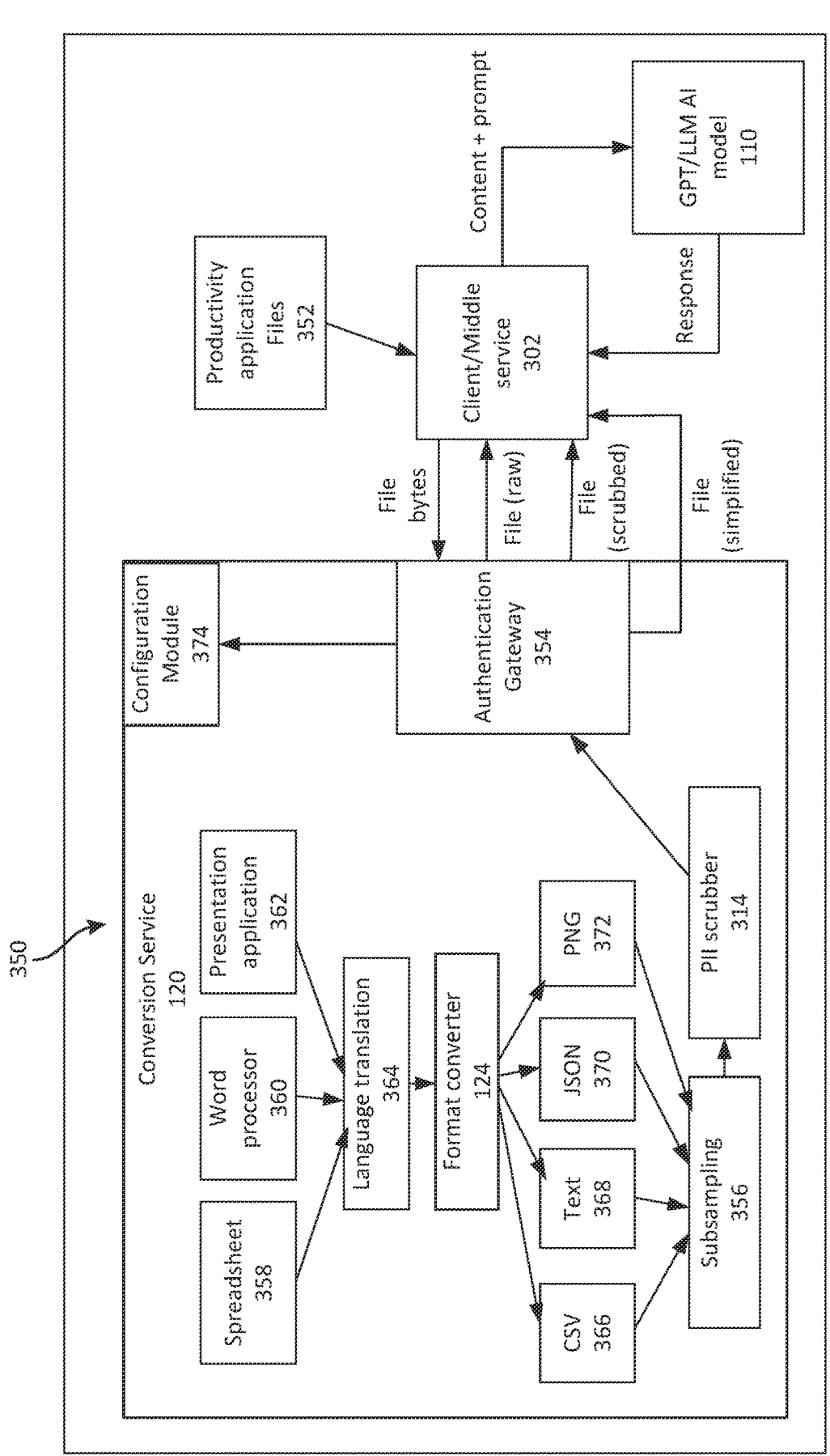
FIG. 3B depicts an illustrative system of preparing files from various productivity applications to be used as input to an AI language model according to principles described herein.

FIG. 3B depicts an illustrative system of preparing files from various productivity applications to be used as input to an AI language model according to principles described herein. As shown in FIG. 3B, a number of productivity application files 352 are held by a client 302 for conversion. The client 302 submits the file bytes to the conversion service 120 through an authentication gateway 354 with a configuration module 374. The authentication gateway allows the users to implicitly authenticate and parse their user or organizational context to allow the system to intelligently set contexts for what kind of PII scrubbing or subsampling is to be conducted.

The productivity application file 352 can be native to, for example, a spreadsheet application 358, a word processor 360 or a presentation/graphic design application 362. If the content is not in the English language, the file may be translated into English by a language translation service 364, as described above. The file is then converted from its native data format to the target AI language model compatible format by a format converter 124. The target format may be, for example, a comma separated value (CSV) format 366, a text format 368, a JSON format 370 or a PNG format 372.

As described above, the converted file content may be subjected to subsampling 356 and a PII scrubber 314. The converted file is then returned to the authentication gateway 354. From the authentication gateway 354, the converted file may be transmitted back to the client in a raw form, a PII-scrubbed form and/or a simplified form. As before, the client 302 can then submit the file (content) and prompt or instruction to the AI language model 110 and receive a desired response.

Figure 3C:
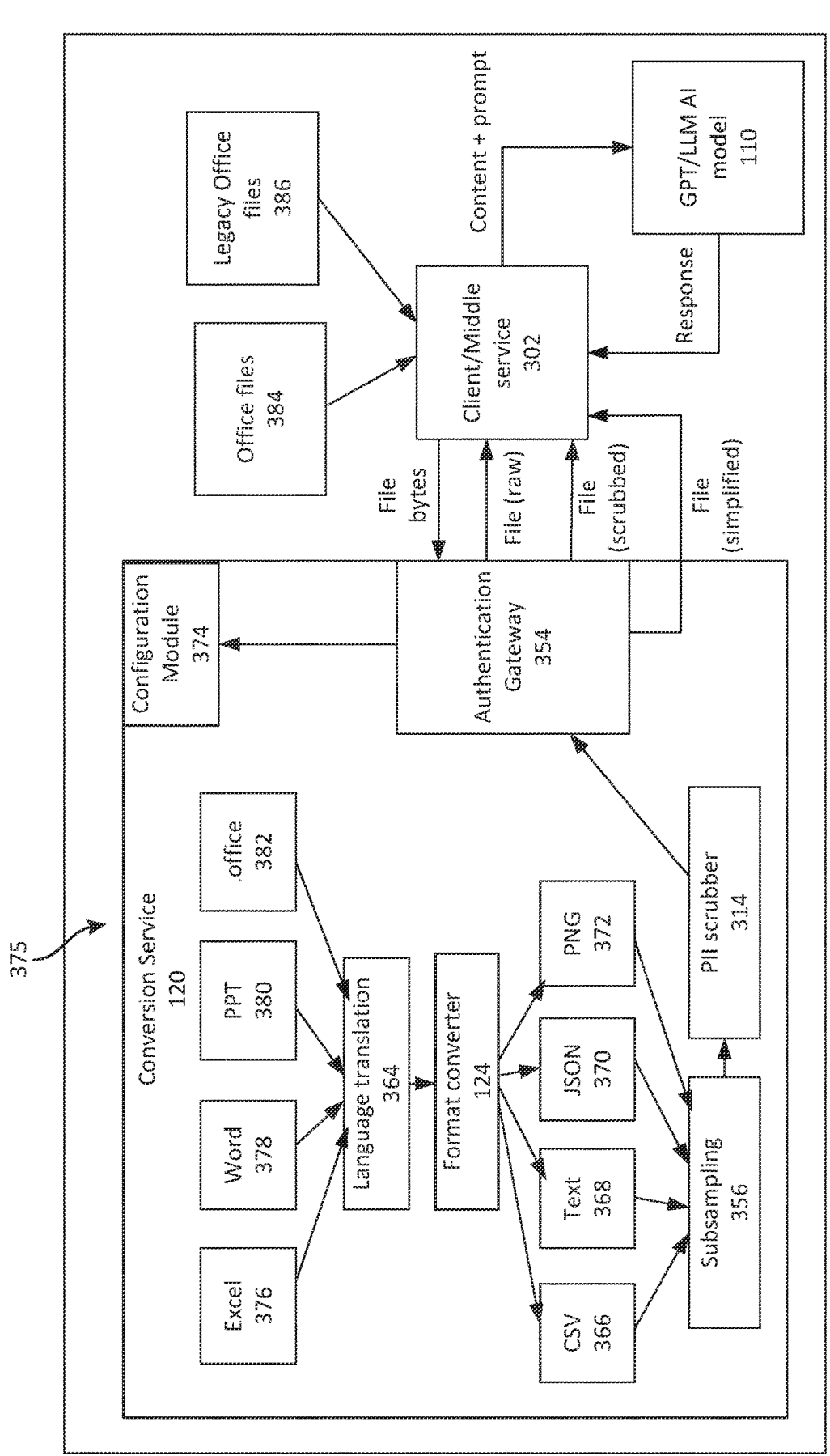
FIG. 3C depicts an illustrative system for preparing files produced by Microsoft Office® suite applications to be used as input to an AI language model according to principles described herein.

FIG. 3C depicts an illustrative system for preparing files produced by Microsoft Office® suite applications to be used as input to an AI language model according to principles described herein. The system in FIG. 3C is substantially similar to that of FIG. 3B except that the productivity application files are specifically Office suite files 384, in current or legacy form 386. Accordingly, the formats handled by the conversion service 120 include Excel, Word, PPT and other Office Suite files (.office). For example, content from PPT files may be converted to JSON, text and PNG formats; Excel files may be converted to CSV format; and Word (.doc or .docx) files may be converted to text and/or Portable Document Format (PDF) formats.

Figure 4A:
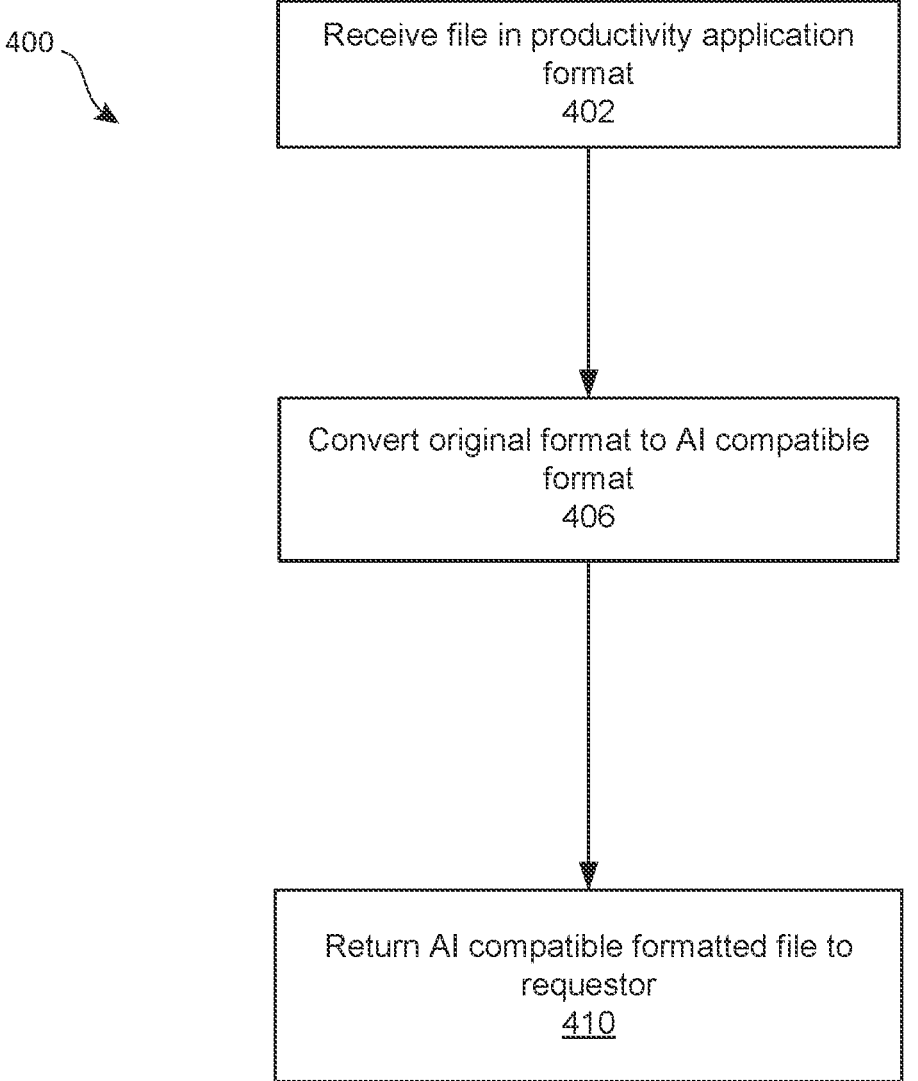
FIG. 4A is a flowchart of an example method for preparing files from various productivity applications to be used as input to an AI language model according to principles described herein.

FIG. 4A is a flowchart of an example method for preparing files from various productivity applications to be used as input to an AI language model according to principles described herein. As shown in FIG. 4A, the method 400 includes receiving 402 a file in a format used by the productivity application used to create the file. The method continues by converting 406 the original format of the file to an AI language model compatible format and returning 410 the AI language model compatible file to the requestor.

Figure 4B:
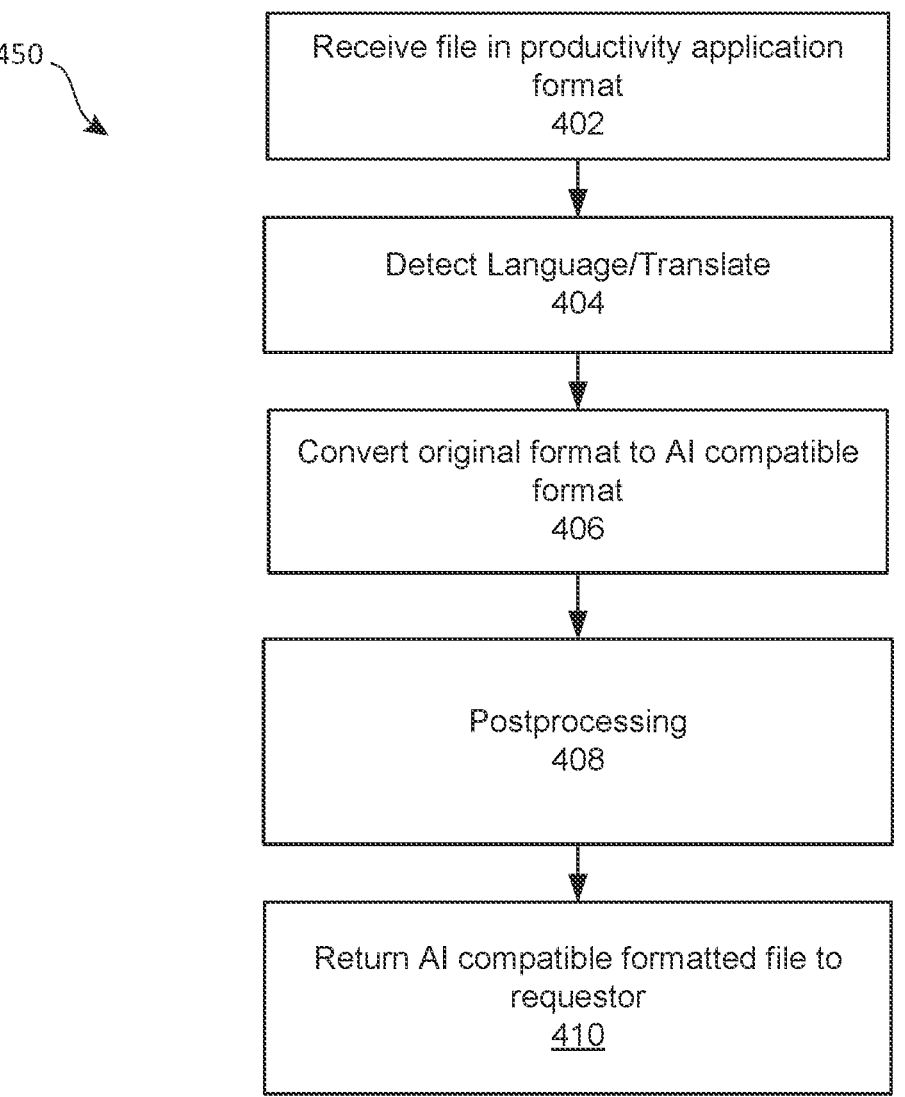
FIG. 4B is a flowchart of a more detailed example method for preparing files from various productivity applications to be used as input to an AI language model according to principles described herein.

FIG. 4B is a flowchart of a more detailed example method for preparing files from various productivity applications to be used as input to an AI language model according to principles described herein. As shown in FIG. 4B, the method 450 includes receiving 402 a file in a format used by the productivity application used to create the file. The method continues by detecting 404 the human language of the content in the file. If this is not English, the content may be translated from the original language into the English language. The method continues by converting 406 the original format of the file to an AI language model compatible format. After this conversion, postprocessing 408 of the file may be complete such as scrubbing the file content of PII, preparing a summary or title for the file, counting tokens or other content processing. The method 450 concludes with returning 410 the AI language model compatible file to the requestor.

The conversion service described herein has many applications. Customers in any space send plenty of feedback to companies/institutions such as enterprises, governments, hospitals and more. The information is usually not directed to a set group/region, or it is relevant to more than one area. The conversion service described here is able to combine customer verbatims/feedback from any file type and, as a next step, it can also summarize the key points and tag it for relevant areas/regions for consumption. This may be based on customer subscription information. Also, languages and summarization to students who are from different language and cultural backgrounds can be useful in the context of education or government with a more standardized language translation and summarization.

Also, government agencies, such as a tax service, must deal with large data sets of tax returns containing sensitive information such as social security numbers, bank account numbers, and addresses. Data analysis in these documents can help identify tax fraud, trends in filing, payments and tax liabilities. This agency can use the conversion service described herein, with the REST API endpoint, to convert the large data set of tax return documents into a simple text format, and also remove all sensitive information at scale. With its ability to convert documents at scale, scrub sensitive information, and perform language translation, the service provides the government organization with a comprehensive solution to their problem. The text format can then be fed into an AI pipeline to analyze data on tax returns and identify potential cases of tax fraud and take appropriate action, such as auditing the tax returns in question.

Spreadsheet applications, such as Excel®, are a commonly used tool in hospitals for storing and managing information on available resources. This could include information on medical equipment, supplies, and personnel. Hospitals use spreadsheets to keep track of inventory levels, schedules, and availability of different resources. By using Excel® to store this information, hospitals can easily track and manage their resources, ensuring that they are being used efficiently and effectively. This information in the form of spreadsheet files can be taken from several different hospitals and converted to CSV files using the conversion service described herein, while assuring that any PII is scrubbed in accordance with privacy laws, such as HIPPA. These CSV files can then be fed into an AI model which can help in analyzing data on hospital operations, such as patient flow and staff schedules, to identify inefficiencies and areas for improvement. This can help hospitals to optimize their resources, potentially reducing costs and improving patient outcomes. This data from different hospitals can help in figuring out which hospitals have what resources available. This, in turn, can help in identifying hospital capacity available in case of emergency, such as where to route the patients for better care and treatment. Lastly, for the hospital, the information of one patient could contain different organ information. A doctor in each specialization could use the AI to deduct the other organ information and only keep the specific organ information of interest to that specialist.

For a deep learning project, the summary could be stored in spreadsheet file and transferred to a CSV file by the conversion service described herein including being PII scrubbed. Based on different deep learning algorithms, the AI could decide which field to deduct and which field to use.

The conversion service described herein is a comprehensive solution for managing and distributing educational content in an academic setting. It converts PPT files into a more accessible and easier-to-use JSON format, performs data subsampling, and enables AI-powered title generation and summarization for an efficient learning experience. It provides file-renaming, summarization features, and improved search and indexing capabilities. With its features, students and educators can easily find and access their information, using efficient organizational tools. This makes the use of educational content more accessible, inclusive for students of different ethnicities, and optimized for an Artificial Intelligence/Machine Learning (AI/ML) pipeline. Ultimately, the conversion service streamlines the educational learning experience, helping learners to focus on their studies.

Figure 5:
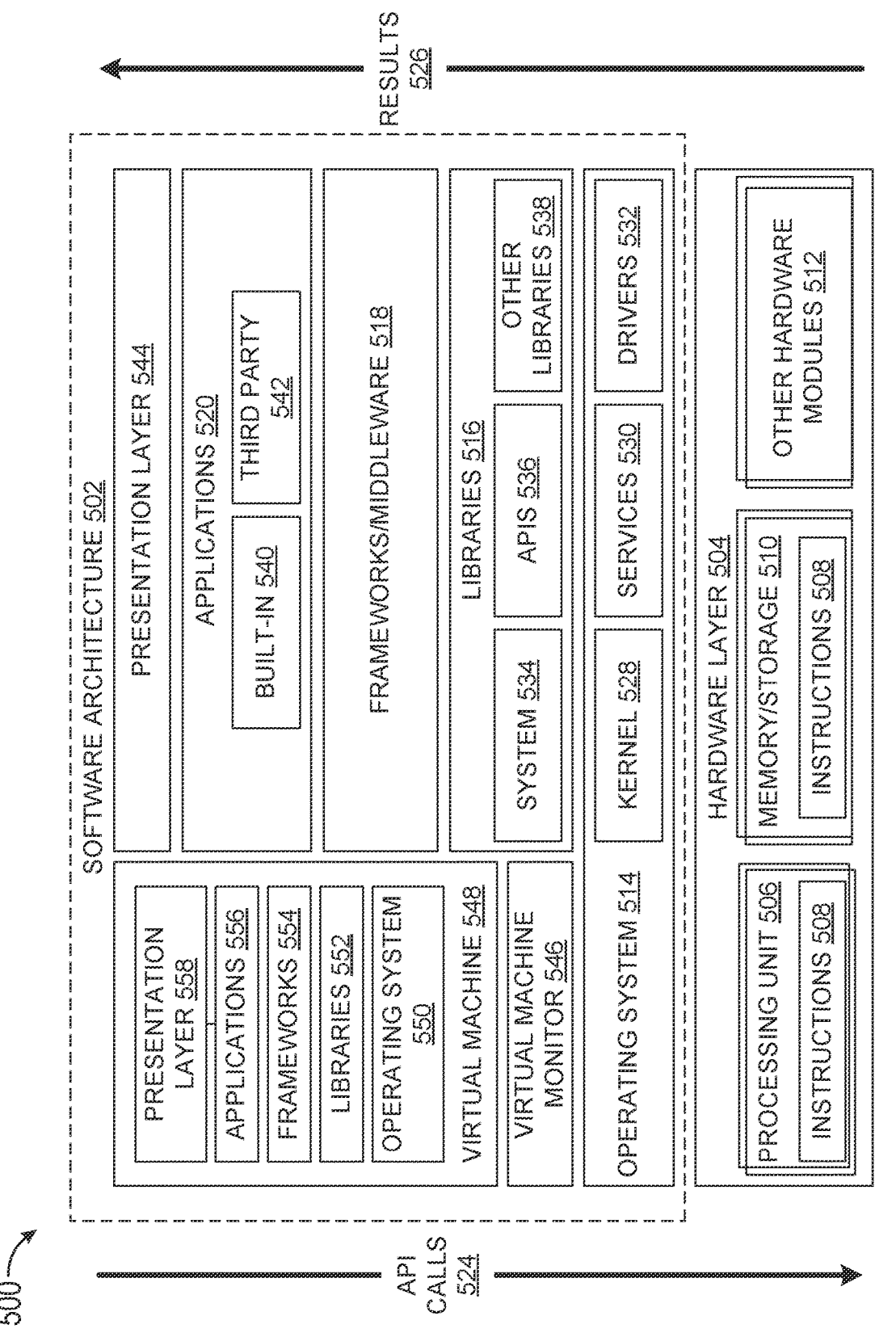
FIG. 5 is a block diagram illustrating an example software architecture, various portions of which may be used in conjunction with various hardware architectures herein described.

FIG. 5 is a block diagram 500 illustrating an example software architecture 502. This software architecture can be part of a system, as described, herein for converting a productivity application file into a format more compatible with an AI language model. Various portions of this illustrated software architecture may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
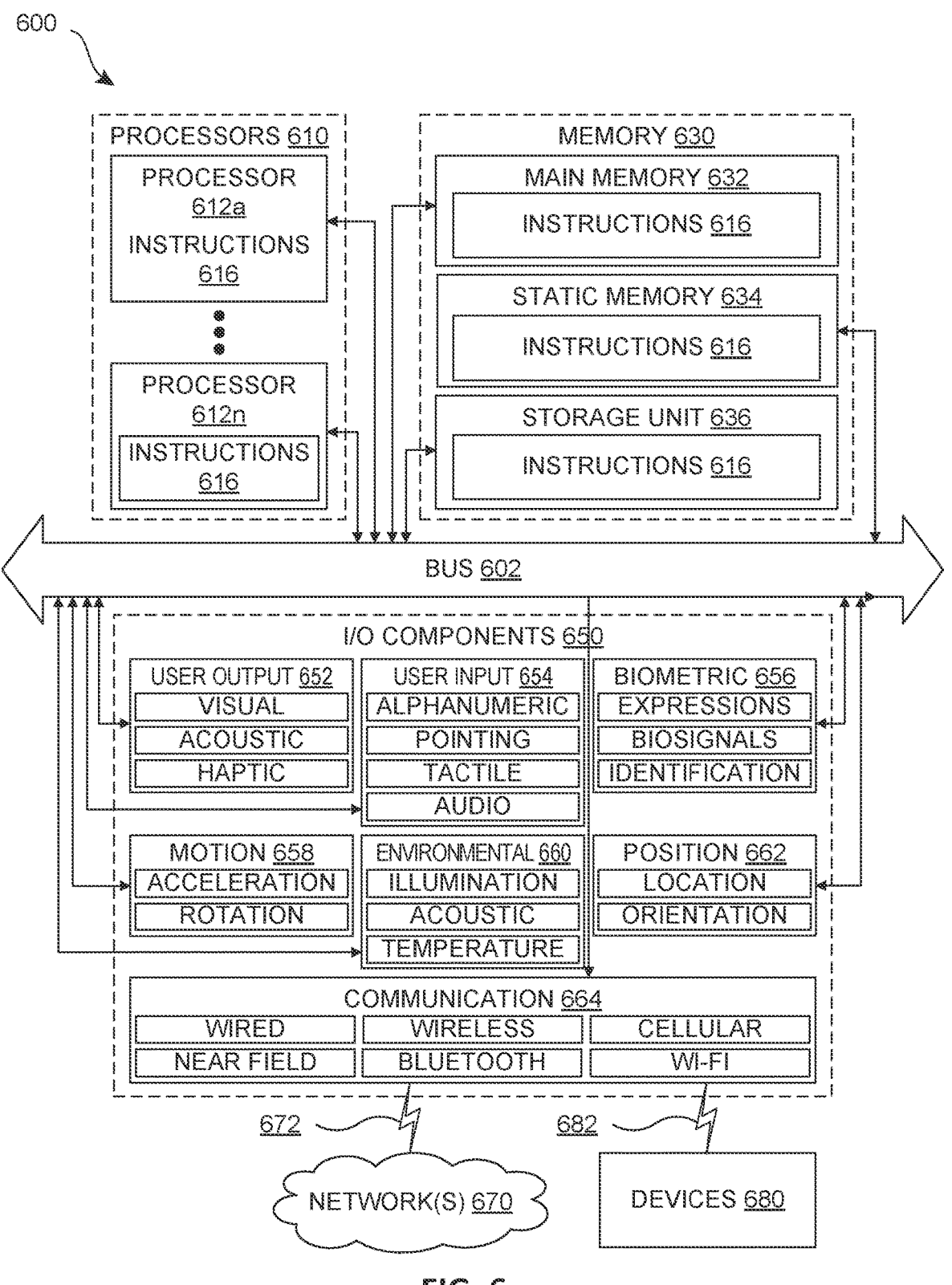
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. This example machine can be part of a system, as described, herein for converting a productivity application file into a format more compatible with an AI language model.

The example machine 600 is in the form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peerto-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system for conditioning productivity application file content for ingestion by an artificial intelligence (AI) language model, the system comprising:

a server system hosting a conversion service, the server system comprising processing and memory resources;

an Application Programming Interface (API) for the conversion service to receive productivity application files at any scale; and a format converter of the conversion service, the format converter converting a productivity application file to a format compatible with the AI language model to enable the AI language model to operate on the file content based on a user instruction submitted with the file content as output by the format converter.

Item 2. The data processing system of Item 1, further comprising a script to submit batches of productivity application files to the conversion service via the API in a scalable manner.

Item 3. The data processing system of Item 1, wherein the format converter comprises a microworker with access to an application code library for a productivity application that produced the productivity application file being converted.

Item 4. The data processing system of Item 1, further comprising a Personal Identifiable Information (PII) scrubber to remove PII or other confidential information from the productivity application file content before submission to the AI language model.

Item 5. The data processing system of Item 4, wherein the PII scrubber utilizes an AI model trained to identify and remove PII or other confidential information from the productivity application file content.

Item 6. The data processing system of Item 1, wherein the conversion service further comprises a language detection/translation module to detect a non-English language in the productivity application file content and translate the productivity application file content to English.

Item 7. The data processing system of Item 1, wherein the conversion service further utilizes an AI language model to produce a title or summary from the productivity application file content.

Item 8. The data processing system of Item 1, wherein the API is a Representational State Transfer (REST) API.

Item 9. The data processing system of Item 8, wherein the API further comprises a gRPC (Remote Procedure Call) service.

Item 10. A method for conditioning productivity application file content for ingestion by an artificial intelligence (AI) language model, the method comprising:

receiving productivity application files with a server system hosting a conversion service via an Application Programming Interface (API) for the conversion service;

converting the content of the productivity application files to a format compatible with the AI language model to enable the AI language model to operate on the file content based on a user instruction submitted with the file content; and returning files to a requestor with the content in the format compatible with the AI language model to enable use of the AI language model on the content independent of an original productivity application file format.

Item 11. The method of Item 10, further comprising accepting the productivity application files from a script configured to submit batches of productivity application files to the conversion service via the API in a scalable manner, the script operative to adjust batch size or a number of batches to scale for any size of database of productivity application files.

Item 12. The method of Item 10, wherein converting the content comprises using a microworker with access to an application code library for a productivity application that produced the productivity application file being converted.

Item 13. The method of Item 10, further comprising, with the conversion service, removing Personal Identifiable Information (PII) or other confidential information from the productivity application file content before submission to the AI language model.

Item 14. The method of Item 13, further comprising using an AI model trained to identify and remove PII or other confidential information from the productivity application file content.

Item 15. The method of Item 10, further comprising, with the conversion service, detecting a non-English language in the productivity application file content and translating the productivity application file content to English.

Item 16. The method of Item 10, further comprising, with the conversion service, using an AI language model to produce a title or summary from the productivity application file content.

Item 17. The method of Item 10, wherein the API is a Representational State Transfer (REST) API.

Item 18. The method of Item 17, wherein the API further comprises a gRPC (Remote Procedure Call) service.

Item 19. The method of Item 10, further comprising performing token and subsampling of the productivity application file content.

Item 20. A non-transitory computer-readable medium comprising a conversion service for conditioning productivity application file content for ingestion by an artificial intelligence (AI) language model, the medium comprising instructions that, when executed by a host device for the conversion service, cause the host device to:

receive output from an AI language model with a server system hosting a conversion service via an Application Programming Interface (API) for the conversion service;

convert the output of the AI language model into a productivity application file; and return the productivity application file to a requestor.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for conditioning productivity application file content for ingestion by an artificial intelligence (AI) language model, the data processing system comprising:

a server system hosting a first conversion service, an AI service, and a second conversion service, the server system comprising processing and memory resources, and the first conversion service including:

an Application Programming Interface (API) coupled to a productivity application to receive productivity application files having productivity application file content;

a format converter coupled to the API for converting the productivity application file content to conditioned content, the conditioned content having a format compatible with the AI language model to enable the AI language model to operate on the conditioned content based on a user instruction submitted with the conditioned content;

a data subsampler coupled to the format converter to receive the conditioned content, the data subsampler operating on the conditioned content to generate at least one of a new title, a summary, or a file name to assist a user in identifying and organizing the conditioned content according to the user instruction, wherein;

the AI service is coupled to the first conversion service to receive the conditioned content and the user instruction, the AI service executing the user instruction to operate on the conditioned content using the AI language model to produce augmented content; and the second conversion service is coupled to the AI service to receive an output from the AI language model, the second conversion service operating on the output to produce a new productivity application file that includes the augmented content, wherein the new productivity application file may be opened by the user using the productivity application to access the augmented content according to the user instruction and at least one of the new title, the summary, and the file name.

2. The data processing system of claim 1, further comprising a script to submit batches of productivity application files to the first conversion service via the API in a scalable manner.

3. The data processing system of claim 1, wherein the format converter comprises a microworker with access to an application code library for the productivity application that produced the productivity application files being converted.

4. The data processing system of claim 1, further comprising a Personal Identifiable Information (PII) scrubber to remove PII or other confidential information from the productivity application file content before submission to the AI language model.

5. The data processing system of claim 4, wherein the PII scrubber utilizes an AI model trained to identify and remove the PII or the other confidential information from the productivity application file content.

6. The data processing system of claim 1, wherein the first conversion service further comprises a language detection/translation module to detect a non-English language in the productivity application file content and translate the productivity application file content to English.

7. The data processing system of claim 1, wherein the API is a Representational State Transfer (REST) API.

8. The data processing system of claim 7, wherein the API further comprises a gRPC (Remote Procedure Call) service.

9. A method for conditioning productivity application file content for ingestion by an artificial intelligence (AI) language model, the method comprising:

receiving productivity application files having productivity application file content with a server system hosting a first conversion service via an Application Programming Interface (API) coupled to a productivity application;

converting the content of the productivity application files to conditioned content, the conditioned content having a format compatible with the AI language model to enable the AI language model to operate on the conditioned content based on a user instruction submitted with the conditioned content;

receiving by a data subsampler the conditioned content, the data subsampler operating on the conditioned content to generate at least one of a new title, a summary, or a file name to assist a user in identifying and organizing the conditioned content according to the user instruction;

receiving by the AI service the conditioned content and the user instruction, the AI service executing the user instructions to operate on the conditioned content using the AI language model to produce augmented content; and receiving by a second conversion service an output from the AI language model, the second conversion service operating on the output to produce a new productivity application file that includes the augmented content, wherein the new productivity application file may be opened by the user using the productivity application to access the augmented content according to the user instruction and at least one of the new title, the summary, and the file name.

10. The method of claim 9, further comprising accepting the productivity application files from a script configured to submit batches of productivity application files to the first conversion service via the API in a scalable manner, the script operative to adjust batch size or a number of batches to scale for any size of database of the productivity application files.

11. The method of claim 9, wherein converting the content comprises using a microworker with access to an application code library for the productivity application that produced the productivity application files being converted.

12. The method of claim 9, further comprising, with the conversion service, removing Personal Identifiable Information (PII) or other confidential information from the productivity application file content before submission to the AI language model.

13. The method of claim 12, further comprising using an AI model trained to identify and remove the PII or the other confidential information from the productivity application file content.

14. The method of claim 9, further comprising, with the conversion service, detecting a non-English language in the productivity application file content and translating the productivity application file content to English.

15. The method of claim 9, wherein the API is a Representational State Transfer (REST) API.

16. The method of claim 15, wherein the API further comprises a gRPC (Remote Procedure Call) service.

17. The method of claim 9, further comprising performing token and subsampling of the productivity application file content.

18. A non-transitory computer-readable medium comprising a first conversion service, an AI service, and a second conversion service, for conditioning productivity application file content for ingestion by an artificial intelligence (AI) language model, the medium comprising instructions that, when executed by a host device, cause the host device to:

receive productivity application files having productivity application file content with a server system hosting a conversion service via an Application Programming Interface (API) coupled to a productivity application;

convert the content of the productivity application files to conditioned content, the conditioned content having a format compatible with the AI language model to enable the AI language model to operate on the conditioned content based on a user instruction submitted with the conditioned content;

receive by a data subsampler the conditioned content, the data subsampler operating on the conditioned content to generate at least one of a new title, a summary, or a file name to assist a user in identifying and organizing the conditioned content according to the user instruction;

receive by the AI service the conditioned content and the user instruction, the AI service executing the user instruction to operate on the conditioned content using the AI language model to produce augmented content; and receive by the second conversion service an output from the AI language model, the second conversion service operating on the output to produce a new productivity application file that includes the augmented content, wherein the new productivity application file may be opened by the user using the productivity application to access the augmented content according to the user instruction and at least one of the new title, the summary, and the file name.

\*   \*   \*   \*   \*